US007589299B2

(12) United States Patent
Fisher et al.

(10) Patent No.: US 7,589,299 B2
(45) **Date of Patent: *Sep. 15, 2009**

(54) ELECTRONIC POWER CONTROL FOR COOKTOP HEATERS

(75) Inventors: Gary Fisher, Goodlettsville, TN (US); Chris Ray Blackson, Cottontown, TN (US)

(73) Assignee: Electrolux Home Products, Inc., Cleveland, OH (US)

( * ) Notice: Subject to any disclaimer, the term of this patent is extended or adjusted under 35 U.S.C. 154(b) by 166 days.

This patent is subject to a terminal disclaimer.

(21) Appl. No.: 11/560,998

(22) Filed: Nov. 17, 2006

(65) Prior Publication Data

US 2007/0108186 A1 May 17, 2007

Related U.S. Application Data

(63) Continuation of application No. 11/171,117, filed on Jun. 30, 2005, now Pat. No. 7,186,955, which is a continuation-in-part of application No. 10/118,294, filed on Apr. 8, 2002, now Pat. No. 6,933,474, which is a continuation-in-part of application No. 09/973,096, filed on Oct. 9, 2001, now abandoned, said application No. 11/171,117 is a continuation-in-part of application No. 10/822,456, filed on Apr. 12, 2004, now Pat. No. 7,022,949.

(60) Provisional application No. 60/461,976, filed on Apr. 10, 2003.

(51) Int. Cl.
*H05B 3/68* (2006.01)
*H02J 3/14* (2006.01)

(52) U.S. Cl. .................... 219/445.1; 219/480; 219/481; 219/482; 219/483; 219/484; 219/485; 219/486; 219/490; 219/492; 219/495; 219/499; 219/508; 219/509; 219/412; 219/414; 219/446.1; 219/448.12; 219/448.17; 219/491; 219/493; 307/38; 307/39; 307/40; 307/41; 307/117

(58) Field of Classification Search ......... 219/480–486, 219/490–499, 508–9, 412–14, 446.1, 445.1, 219/448.12, 448.17; 307/38–41, 117
See application file for complete search history.

(56) References Cited

U.S. PATENT DOCUMENTS

| | | | |
|---|---|---|---|
| 3,903,395 | A | 9/1975 | Hamstra |
| 4,052,591 | A | 10/1977 | Sekera, Jr. |
| 4,493,980 | A | 1/1985 | Payne et al. |
| 4,849,595 | A | 7/1989 | Fowler |
| 4,891,497 | A | 1/1990 | Yoshimura |
| 5,191,190 | A | 3/1993 | Dodson |

(Continued)

*Primary Examiner*—Shawntina Fuqua
(74) *Attorney, Agent, or Firm*—Pearne & Gordon LLP

(57) ABSTRACT

In one aspect, a cooktop heating system that include a first cooktop heating element, a second cooktop heating element, and an interface device. The system also includes a controller for selectively associating the interface device with any one or both of the first cooktop heating element and the second cooktop heating element. In another aspect, the system includes at least one cooktop heating element, a potentiometer, and controller arrangement operatively connected between the potentiometer and the at least one cooktop heating element to determine heating of the at least one cooktop heating element responsive to the input provided by the potentiometer and control power provision to the at least one cooktop heating element responsive to the determination.

20 Claims, 2 Drawing Sheets

U.S. PATENT DOCUMENTS

| | | | |
|---|---|---|---|
| 5,345,807 A | 9/1994 | Butts et al. | |
| 5,451,746 A | 9/1995 | Kadwell et al. | |
| 5,662,465 A | 9/1997 | Kano | |
| 5,710,409 A | 1/1998 | Schwarzbacker et al. | |
| 5,786,996 A | 7/1998 | Vitkus et al. | |
| 5,841,112 A | 11/1998 | Brooks | |
| 5,947,370 A | 9/1999 | Rona et al. | |
| 5,981,916 A | 11/1999 | Griffiths et al. | |
| 6,111,231 A | 8/2000 | Corson et al. | |
| 6,191,391 B1 | 2/2001 | Deo | |
| 6,198,080 B1 | 3/2001 | Rice et al. | |
| 6,712,066 B1 | 3/2004 | Atkinson et al. | |
| 6,717,117 B2 * | 4/2004 | Blanchard et al. | 219/492 |
| 6,809,301 B1 | 10/2004 | McIntyre et al. | |
| 2003/0094448 A1 | 5/2003 | Shukla et al. | |

* cited by examiner

ELECTRONIC POWER CONTROL FOR COOKTOP HEATERS

CROSS-REFERENCE TO RELATED APPLICATIONS

This application is a continuation of U.S. application Ser. No. 11/171,117, filed Jun. 30, 2005. U.S. application Ser. No. 11/171,117, filed Jun. 30, 2005, is a continuation-in-part of U.S. application Ser. No. 10/118,294, filed on Apr. 8, 2002, now U.S. Pat. No. 6,933,474, which is a continuation-in-part of U.S. application Ser. No. 09/973,096, filed Oct. 9, 2001, now abandoned. U.S. application Ser. No. 11/171,117, filed Jun. 30, 2005, is also a continuation-in-part of U.S. application Ser. No. 10/822,456, filed Apr. 12, 2004, now U.S. Pat. No. 7,022,949, which claims the benefit of U.S. provisional application No. 60/461,976, filed Apr. 10, 2003, now expired. All of the foregoing applications are incorporated herein by reference.

BACKGROUND OF THE INVENTION

1. Field of the Invention

The present invention relates to configurable electronic controls for cooktop heating elements.

2. Description of Related Art

Conventional controls for cooktop heating elements utilize switches, pushbuttons, indicator lights, potentiometers, and/or electronic controls. Controls are typically provided for controlling separate heating elements on a cooktop. Controls may be provided for simultaneously controlling multiple heating elements. It would be useful if a single interface device or multiple interface devices could be selectively associated with one or more heating elements.

Conventional controls for cooktop heating elements provide a single heating profile for a heating element. For example, a cooktop heating element may be controlled by a potentiometer having an adjustment knob for setting a desired heating element temperature. Each position of the adjustment knob along the available rotation of the potentiometer, for example, approximately one revolution, would correspond to a single heating element temperature. It would be useful if multiple heating profiles were available for the heating element so that multiple heating element temperatures could be selectively associated with a single interface device setting.

BRIEF SUMMARY OF THE INVENTION

In accordance with one aspect, the present invention provides a cooktop heating system that includes a first cooktop heating element, a second cooktop heating element, and an interface device. The system also includes a controller for selectively associating the interface device with any one or both of the first cooktop heating element and the second cooktop heating element.

In accordance with another aspect, the present invention provides a cooktop heating system. The system includes at least one cooktop heating element, a potentiometer manually operable to input a cooktop heating element setting, and controller arrangement operatively connected between the potentiometer and the at least one cooktop heating element to determine heating of the at least one cooktop heating element responsive to the input provided by the potentiometer and control power provision to the at least one cooktop heating element responsive to the determination.

DESCRIPTION OF AN EXAMPLE EMBODIMENT

Figure 1:
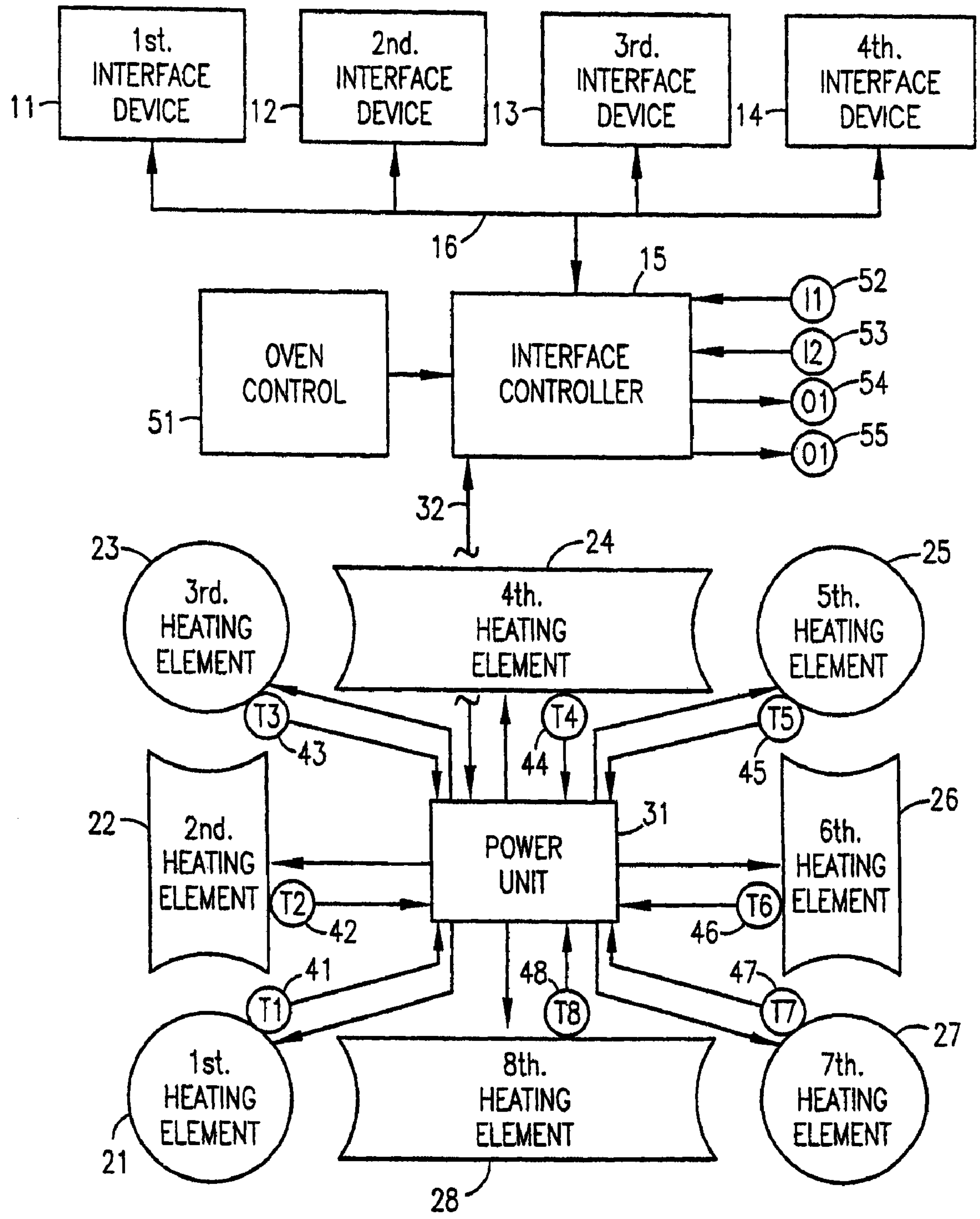
FIG. 1 is a schematic diagram illustrating a power control system for cooktop heating elements according to the present invention.

FIG. 1 provides a schematic illustration of an example power control system for cooktop heating elements including multiple user interface devices and multiple heating elements, according to one embodiment of the present invention. The example power control system includes a first interface device 11, a second interface device 12, a third interface device 13, and a fourth interface device 14.

Each interface device 11-14 can include one or more electronic interface devices for inputting and/or outputting, displaying, or audibly broadcasting information, such as instructions, set points, and miscellaneous system conditions. Examples of such instructions, set points, and system conditions can include a desired heating element power setting, current heating element temperature, and a hot cooktop warning. Examples of electronic interface devices include, but are not limited to, membrane switches, capacitive or so-called field sensitive sensors, multi-segment light emitting diode (LED) displays, touch-screen displays, liquid crystal displays (LCDs), plasma displays, cathode ray tubes (CRTs), vacuum fluorescent displays (VFDs), and the like.

Each interface device 11-14 can also include one or more discrete devices, such as toggle switches, pushbuttons, multiple position rotary switches, discrete LEDs, incandescent lights, and the like. Furthermore, each interface device 11-14 can also include one or more analog devices, such as potentiometers and analog meters, for example. In addition, each interface device 11-14 can include a combination of one or more electronic interface devices, discrete interface devices, and analog interface devices. Interface devices 11-14 may be located locally near the heating elements or remotely. In FIG. 1, four interface devices are shown. However, the power control system of the present invention is not limited to four interface devices, and fewer or greater than four interface devices may be provided.

An interface controller 15 communicates with and/or monitors the interface devices 11-14. Communication wiring 16 is provided between the interface controller 15 and the interface devices 11-14. Communication wiring can include a digital communication line and/or a plurality of control and instrumentation conductors, depending on the composition of the interface devices 11-14. The interface controller 15 monitors user-inputted information and controls output information for the interface devices 11-14.

The power control system of the present invention controls power to one or more electric cooktop heating elements. FIG. 1 shows a first heating element 21, a second heating element 22, a third heating element 23, a fourth heating element 24, a fifth heating element 25, a sixth heating element 26, a seventh heating element 27, and an eighth heating element 28. However, the power control system is not limited to controlling eight heating elements, and fewer or greater than eight heating elements may be provided. In one embodiment of the present invention, the heating elements 21-28 include electrical resistance heating elements. In another embodiment, the heating elements 21-28 include electrical induction heating elements.

A power unit 31 controls power output to the heating elements 21-28. The power unit 31 includes a plurality of switches, for example relays, transistors, thyristors, silicon controlled rectifiers, and the like, for controlling power output to the heating elements. When the power unit 31 causes a switch or switches for a particular heating element to be closed, power is provided to the heating element. Conversely, when the power unit 31 causes a switch or switches for a particular heating element to be opened, power ceases to be supplied to the element.

A communications bus 32 allows for bi-directional communications between the interface controller 15 and the power unit 31. Over the communications bus 32, the interface controller 15 can provide information to the power unit 31 regarding the operation of the heating elements, such as instructions regarding heating element power level, runtime, and the like. The interface controller 15 can also receive information from the power unit 31, such as status information regarding the heating elements 21-28, for example, on/off and current temperature. Because the interface controller 15 communicates with and/or monitors the interface devices 11-14, and communicates with the power unit 31, information regarding the heating elements 21-28 and control of the heating elements 21-28 can be provided to a system user. For example, the user can input one or more heating element settings at an interface device for control of one or more heating elements.

The interface controller 15 and power unit 31 each include a processor, for example, a microprocessor, for carrying out programmed instructions. In one embodiment, the interface controller 15 and power unit 31 include separate processors. In another embodiment, the interface controller 15 and power unit 31 utilize a single processor, and the communications bus 32 between the interface controller 15 and power unit 31 is unnecessary.

The power unit 31 monitors the temperature of each heating element 21-28 through a temperature sensor located at each heating element 21-28. FIG. 1 shows a first temperature sensor 41, a second temperature sensor 42, a third temperature sensor 43 a fourth temperature sensor 44, a fifth temperature sensor 45, a sixth temperature sensor 46, a seventh temperature sensor 47, and an eighth temperature sensor 48 located at heating elements 21-28, respectively. Temperature information obtained from the temperature sensors 41-48 can be displayed at the interface devices 11, 12,13, 14, or used by program control algorithms of the interface controller 15 and/or power unit 31. The temperature sensors 41-48 can include such devices as thermocouples or thermistors, for example. The power unit 31 and/or interface controller 15 can also monitor ambient temperature through an additional temperature sensor or sensors (not shown). The power unit 31 and/or interface controller 15 can be programmed to control an auxiliary device based on measured ambient temperature, such as energizing control relay to start a fan when the ambient temperature exceeds a desired level.

As stated above, the interface controller 15 communicates with and/or monitors the interface devices over communication wiring 16. The interface controller 15 is programmed to selectively associate any one or more interface devices 11-14 with any one or more heating elements 21-28. This is possible because the interface devices 11-14 are not directly connected to the heating elements 21-28. The interface devices 11-14 are directly connected to the interface controller 15, which communicates with the power unit over the communications bus 32. The power unit 31 controls power output to the heating elements 21-28. Accordingly, through communications with the power unit 31, the interface controller 15 can selectively associate any one or more interface devices 11-14, and, therefore, their respective input and output information, with any one or more heating elements 21-28.

For example, the third interface device 13 can be selectively associated with the second heating element 22 and the seventh heating element 27. Accordingly, input and output information related to the second 22 and seventh 27 heating elements, which can include, for example, the desired power setting for the heating elements (input) and the current temperature of the heating elements (output), can be respectively inputted and outputted at the third interface device. As stated above, any one or more interface devices 11-14 can be selectively associated with any one or more heating elements 21-28.

The selective association of interface devices 11-14 with heating elements 21-28 performed by the interface controller 15 can be based upon user-inputted information. For example, selectable or configurable inputs can be provided at the interface devices 11-14 by which the user can instruct the interface controller 15 to selectively associate any one or more interface devices 11-14 with any one or more heating elements 21-28. Alternatively, a dedicated interface device for system setup could be provided for allowing a user to selectively associate other interface devices with heating elements 21-28. Still alternatively, a system setup communications port could be provided for allowing communications with the interface controller 15 from a device such a personal computer so that one or more interface devices 11-14 could be selectively associated with one or more heating elements 21-28. The interface controller 15 is programmed to perform the above-described selective associations and does not need to be reprogrammed in order to change the association of interface devices 11-14 and heating elements 21-28.

According to one aspect of the present invention, any one or more interface devices 11-14 can be selectively associated with any two or more of the heating elements 21-28. According to another aspect of the present invention, any one or more interface devices 11-14 can be selectively associated with any three or more of the heating elements 21-28. According to another aspect of the present invention, any one or more interface devices 11-14 can be selectively associated with any four or more of the heating elements 21-28. According to another aspect of the present invention, any one or more interface devices 11-14 can be selectively associated with any five or more of the heating elements 21-28. According to another aspect of the present invention, any one or more interface devices 11-14 can be selectively associated with any six or more of the heating elements 21-28. According to another aspect of the present invention, any one or more interface devices 11-14 can be selectively associated with any seven or more of the heating elements 21-28. According to another aspect of the present invention, any one or more interface devices 11-14 can be selectively associated with all eight of the heating elements 21-28. It will be understood that, as limited by the capabilities of utilized hardware, for example, processor addressing capabilities, any number of interface devices could be selectively associated with any number of heating elements.

According to one aspect of the present invention, any two or more interface devices 11-14 can be selectively associated with any one or more of the heating elements 21-28. According to another aspect of the present invention, any two or more interface devices 11-14 can be selectively associated with any two or more of the heating elements 21-28. According to another aspect of the present invention, any two or more interface devices 11-14 can be selectively associated with any three or more of the heating elements 21-28. According to another aspect of the present invention, any two or more interface devices 11-14 can be selectively associated with any four or more of the heating elements 21-28. According to another aspect of the present invention, any two or more interface devices 11-14 can be selectively associated with any five or more of the heating elements 21-28. According to another aspect of the present invention, any two or more interface devices 11-14 can be selectively associated with any six or more of the heating elements 21-28. According to another aspect of the present invention, any two or more interface devices 11-14 can be selectively associated with any seven or more of the heating elements 21-28. According to another aspect of the present invention, any two or more interface devices 11-14 can be selectively associated with all eight of the heating elements 21-28.

According to one aspect of the present invention, any three or more interface devices 11-14 can be selectively associated with any one or more of the heating elements 21-28. According to another aspect of the present invention, any three or more interface devices 11-14 can be selectively associated with any two or more of the heating elements 21-28. According to another aspect of the present invention, any three or more interface devices 11-14 can be selectively associated with any three or more of the heating elements 21-28. According to another aspect of the present invention, any three or more interface devices 11-14 can be selectively associated with any four or more of the heating elements 21-28. According to another aspect of the present invention, any three or more interface devices 11-14 can be selectively associated with any five or more of the heating elements 21-28. According to another aspect of the present invention, any three or more interface devices 11-14 can be selectively associated with any six or more of the heating elements 21-28. According to another aspect of the present invention, any three or more interface devices 11-14 can be selectively associated with any seven or more of the heating elements 21-28. According to another aspect of the present invention, any three or more interface devices 11-14 can be selectively associated with all eight of the heating elements 21-28.

According to one aspect of the present invention, all four of the interface devices 11-14 can be selectively associated with any one or more of the heating elements 21-28. According to another aspect of the present invention, all four of the interface devices 11-14 can be selectively associated with any two or more of the heating elements 21-28. According to another aspect of the present invention, all four of the interface devices 11-14 can be selectively associated with any three or more of the heating elements 21-28. According to another aspect of the present invention, all four of the interface devices 11-14 can be selectively associated with any four or more of the heating elements 21-28. According to another aspect of the present invention, all four of the interface devices 11-14 can be selectively associated with any five or more of the heating elements 21-28. According to another aspect of the present invention, all four of the interface devices 11-14 can be selectively associated with any six or more of the heating elements 21-28. According to another aspect of the present invention, all four of the interface devices 11-14 can be selectively associated with any seven or more of the heating elements 21-28. According to another aspect of the present invention, all four of the interface devices 11-14 can be selectively associated with all eight of the heating elements 21-28.

In one embodiment of the present invention, the power control system includes means for sensing the presence of a cooking receptacle at any one or more of the heating elements 21-28. The terms "cooking receptacle" as used herein refer to a utensil into or onto which food items are placed for cooking, such as a pan, pot, skillet, cooking sheet, or other cooking vessel. The means for sensing the presence of a cooking receptacle may include any structure to accomplish such function. As examples, the means for sensing may include antenna array systems in which a frequency change or disturbance in a received signal can indicate the presence of a cooking receptacle, mechanical systems in which a switch closure or pressure sensor can indicate the presence of a cooking receptacle, rate-of-change systems in which a rate of heat loss can indicate the presence of a cooking receptacle, and metal detector type systems. Such means may include separate structure or may be structure that is within the system that also provides another function. For example, such means could be incorporated into the sensors 41-47 and/or the power unit 31 and/or the controller 15. The inclusion of separate structure to accomplish the function of sensing the presence of a cooking receptacle or the use of existing structure to accomplish the function are not limitations on the present invention.

The means for sensing the presence of a cooking receptacle is monitored by the interface controller 15 as an auxiliary input 52, 53 to the interface controller 15. Alternatively, the means for sensing the presence of a cooking receptacle could be monitored by the power unit 31. The power control system is adapted to permit a power output to a particular heating element 21-28 only when a cooking receptacle is sensed to be present at the particular heating element. It will be appreciated that the power output to any one or more of heating elements 21-28 can be prevented based on the absence of a cooking receptacle at any one or more heating elements 21-28.

The interface controller 15 includes a plurality of auxiliary inputs 52, 53 and auxiliary outputs 54, 55 which can be analog and/or digital inputs and outputs. Examples of auxiliary inputs 52, 53 are contact closure inputs, discrete voltage inputs, for example 5 VDC, and voltage and current signal inputs. Examples of auxiliary outputs 54, 55 are contact closure outputs, for example relay outputs, discrete voltage outputs, for example 5 VDC, and voltage and current signal outputs. The interface controller 15 can monitor the auxiliary inputs 52, 53 and take actions in response to the inputs. For example, the interface controller 15 could monitor a contact closure on a remote fan controller, indicating a fan running condition, and display this information on an interface device 11-14. In a further example, the interface controller 15 could monitor an ambient temperature through a temperature sensor connected to one of the auxiliary inputs 52, 53 and call for a remote fan or fans to run, via one or more auxiliary outputs 54, 55. In a still further example, a user could call for a remote device to run, for example, a fan, by inputting such a call at one of the interface devices 11-14. The interface controller 15 would receive the call and assert the appropriate auxiliary output 54, 55 to run the fan.

Each of the electric heating elements 21-28 is separately connected to the power unit 31 so that its power output can be adjusted as required by the user interface controller 15. As described above, switches on the power unit 31 control the power output to the heating elements 21-28. The power unit 31 can vary the level of power provided to each heating element 21-28 by controlling output switches and varying the duty cycle, in terms of the percentage of the time that the heating element is permitted to draw electrical current, of a pulse-width modulated output.

The interface controller 15 can monitor the interface devices 11-14 for the heating element power setting, which would typically be input by the user as a magnitude setting, for example, heat setting 3 (of 10, of 15, of 20, of 25, etc.) or a specific temperature setting, for example 200° Fahrenheit. The interface controller 15 outputs a heating element power level to the power unit 31 based on the heating element power setting. For example, a heating element power setting of 3 could correspond to a heating element power level of 30% duty cycle. In an alternative embodiment, the interface controller 15 outputs the heating element power setting directly to the power unit 31, which converts the heating element power setting to the heating element power level.

Multiple heating profiles may be programmed into the interface controller 15, or, alternatively, into the power unit 31, which allow a heating element power setting to correspond to multiple heating element power levels. For example, in a low temperature operation, such as a "simmer mode," all of the available heating element power settings could correspond to low duty cycle heating element power levels (for example, less than 50% duty cycle). In a high temperature operation, all of the available heating element power settings could correspond to high duty cycle heating element power levels (for example, greater than 50% duty cycle). It is to be appreciated that various other profiles could be provided, including specialty settings such as wok or grilling settings. Multiple heating profiles could thus be provided. The heating profile selection can be based upon a user input at an interface device 11-14, upon the state of an auxiliary input 52, 53, or upon a programmed control algorithm. Also, it is to be appreciated that because of the ability to program, various additional aspects can be controlled or provided, such as star-K compliance (e.g., delay start time), demo mode (e.g., operation without actual heating of the elements), cook-top lockout (e.g., maintenance of non-heating of the elements), etc.

Each of following tables provides an example of a unique heating profile. Ten heating element power settings and corresponding power levels are provided in each example heating profile. It will be understood that the current invention is not limited to heating profiles including ten heating element power settings and corresponding power levels, and that the scope of the invention includes heating profiles including fewer and greater than ten heating element power settings and levels. Similarly, the current invention is not limited four heating profiles, and that the scope of the invention includes greater and less than four heating profiles. From the example heating profiles below, it will be apparent that the relationship between heating element power settings and corresponding power levels can be either linear or non-linear.

TABLE 1

Example Heating Profile No. 1

| Power Setting | Power Level (Duty Cycle %) |
|---|---|
| 1 | 10 |
| 2 | 20 |
| 3 | 30 |
| 4 | 40 |
| 5 | 50 |
| 6 | 60 |
| 7 | 70 |
| 8 | 80 |
| 9 | 90 |
| 10 | 100 |

TABLE 2

Example Heating Profile No. 2

| Power Setting | Power Level (Duty Cycle %) |
|---|---|
| 1 | 4 |
| 2 | 8 |
| 3 | 12 |
| 4 | 16 |
| 5 | 20 |
| 6 | 24 |
| 7 | 28 |
| 8 | 32 |
| 9 | 36 |
| 10 | 40 |

TABLE 3

Example Heating Profile No. 3

| Power Setting | Power Level (Duty Cycle %) |
|---|---|
| 1 | 50 |
| 2 | 51 |
| 3 | 53 |
| 4 | 55 |
| 5 | 57 |
| 6 | 62 |
| 7 | 70 |
| 8 | 80 |
| 9 | 90 |
| 10 | 100 |

TABLE 4

Example Heating Profile No. 4

| Power Setting | Power Level (Duty Cycle %) |
|---|---|
| 1 | 2 |
| 2 | 5 |
| 3 | 9 |
| 4 | 15 |
| 5 | 25 |
| 6 | 37 |
| 7 | 50 |
| 8 | 65 |
| 9 | 80 |
| 10 | 100 |

The power unit 31 monitors the temperature of the heating elements 21-28 via the temperature sensors 41-48. This allows the interface controller 15 and/or power unit 31 to perform closed-loop or feedback temperature control of the heating elements, for example proportional-integral-derivative (PID) control. Multiple heating profiles may be programmed into the interface controller 15, or, alternatively, into the power unit 31, which allow the heating element power settings to correspond to multiple heating element power levels, wherein the power levels correspond to specific heating element temperatures, rather than duty cycle percentages as described above.

Figure 2:
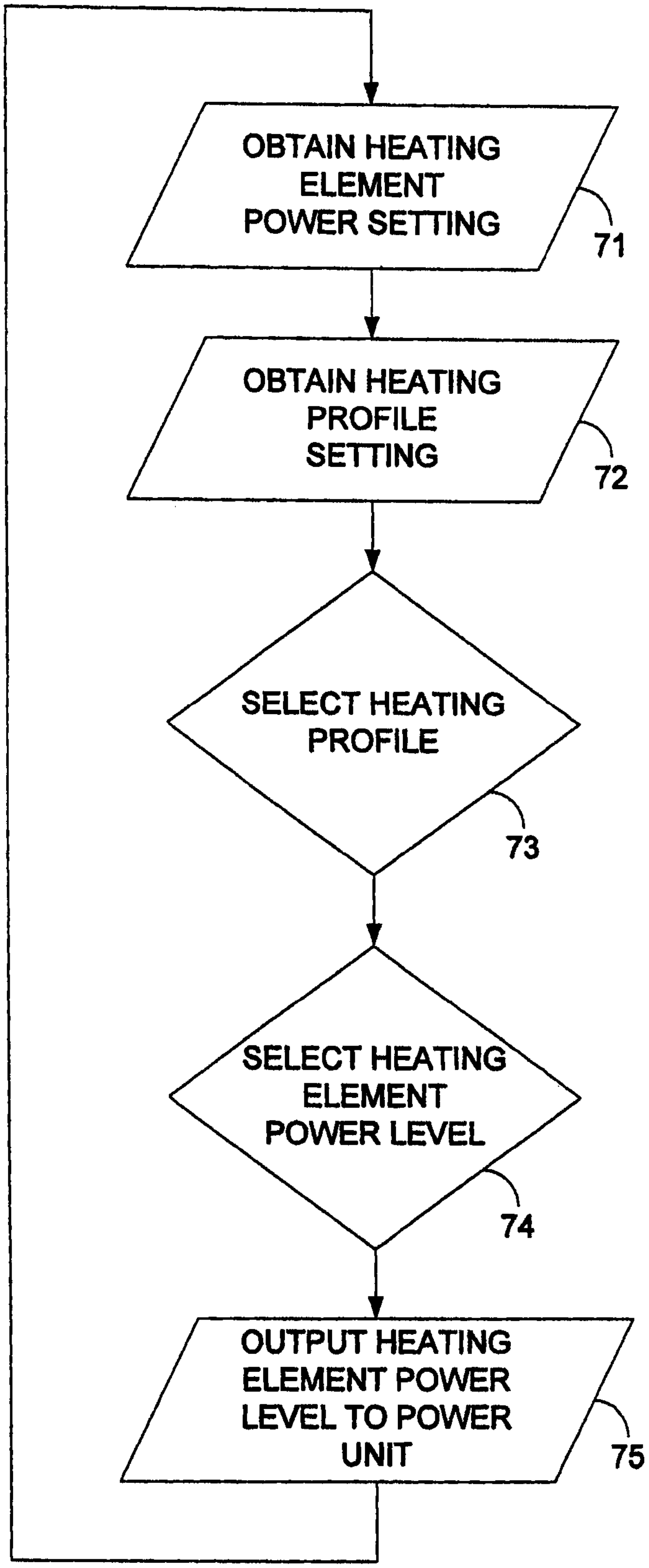
FIG. 2 is a flowchart showing a method of controlling power to cooktop heating elements involving multiple heating profiles.

A method of controlling power to cooktop heating elements involving multiple heating profiles will now be described. Referring to FIG. 2, at step 71 heating element power settings are obtained. Heating element power settings are typically provided by the user at the interface devices 11-14. However, heating element power settings could also be generated by the interface controller 15 itself according to a control algorithm, or by another controller, for example, an oven controller 51 or power unit 31.

At step 72, a heating profile setting is obtained. The heating profile setting can be based upon a user input at an interface device 11-14, upon the state of an auxiliary input 52, 53, or upon a programmed control algorithm. After the heating profile setting is obtained, as shown in step 73, the corresponding heating profile is selected from the one or more programmed heating profiles. The power control system can be delivered to the user with multiple heating profiles pre-programmed and/or the heating profiles can be user-definable.

As shown in step 74, the heating element power level that corresponds to the heating element power setting is selected from the chosen heating profile. The selected heating element power level is then outputted to the power unit 31 for control of the appropriate heating element or elements, as shown in step 75.

The power control system can be provided on a cooking device including a range and an oven, wherein power distribution to the oven is controlled by the oven controller 51. The oven controller can communicate with the interface controller 15 and/or power unit 31, which allows for the coordinated control of oven heating elements and cooktop heating elements 21-28.

It should be evident that this disclosure is by way of example and that various changes may be made by adding, modifying or eliminating details without departing from the fair scope of the teaching contained in this disclosure. For example, a different number of interface devices may be provided, a different number of heating devices may be provided, and/or a different number of elements per heater may be provided. The invention is therefore not limited to particular details of this disclosure except to the extent that the following claims are necessarily so limited.

What is claimed is:

1. A cooktop heating system, comprising:
- a cooktop heating element;
- a first user interface device for receiving a variable first heating element setting from a user;
- a second user interface device for receiving a variable second heating element setting from the user;
- a third user interface device for receiving a variable third heating element setting from the user; and
- a controller for selectively associating the cooktop heating element with at least one of the first user interface device, the second user interface device, and the third user interface device.

2. A cooktop heating system as set forth in claim 1, wherein a selective association of the cooktop heating element with at least one of the first user interface device, the second user interface device, and the third user interface device is based on an input from the user.

3. A cooktop heating system as set forth in claim 1, wherein the controller includes a processor.

4. A cooktop heating system as set forth in claim 3, wherein the controller is programmed to obtain a heating element power setting from the first user interface device and select a heating element power level that corresponds to the heating element power setting from one of a first heating profile and a second heating profile.

5. A cooktop heating system as set forth in claim 4, wherein a duty cycle of power output to the cooktop heating element corresponds to the heating element power level.

6. A cooktop heating system, comprising:
- a first cooktop heating element;
- a second cooktop heating element;
- a third cooktop heating element;
- a user interface device for receiving a heating element setting from a user; and
- a controller for selectively associating the user interface device with any one or more of the first cooktop heating element, the second cooktop heating element, and the third cooktop heating element.

7. A cooktop heating system as set forth in claim 6, wherein a selective association of the user interface device with any one or more of the first cooktop heating element, the second cooktop heating element, and the third cooktop heating element is based on an input from the user.

8. A cooktop heating system as set forth in claim 6, further comprising an additional user interface device, wherein the controller can selectively associate the additional user interface device with any one or more of the first cooktop heating element, the second cooktop heating element, and the third cooktop heating element.

9. A cooktop heating system as set forth in claim 6, further comprising a first additional user interface device and a second additional user interface device, wherein the controller can selectively associate any of said user interface devices with any one or more of the first cooktop heating element, the second cooktop heating element, and the third cooktop heating element.

10. A cooktop heating system as set forth in claim 6, wherein the controller includes a processor.

11. A cooktop heating system as set forth in claim 10, wherein the controller is programmed to obtain a heating element power setting from the user interface device and select a heating element power level that corresponds to the heating element power setting from one of a first heating profile and a second heating profile.

12. A cooktop heating system as set forth in claim 11, wherein a duty cycle of power output to one or more of the first cooktop heating element, the second cooktop heating element, and the third cooktop heating element corresponds to the heating element power level.

13. A cooktop heating system, comprising:
- a first cooktop heating element;
- a second cooktop heating element;
- a first user interface device for receiving a first heating element setting from a user;
- a second user interface device for receiving a second heating element setting from the user; and
- a controller for selectively associating both of the first cooktop heating element and the second cooktop heating element with either one of the first user interface device and the second user interface device.

14. A cooktop heating system as set forth in claim 13, further comprising a third user interface device for receiving a user input, wherein the selective association is based on the user input.

15. A cooktop heating system as set forth in claim 13, further comprising a third user interface device, wherein the controller can selectively associate both of the first cooktop heating element and the second cooktop heating element with the third user interface device.

16. A cooktop heating system as set forth in claim 13, further comprising means for controlling an auxiliary device.

17. A cooktop heating system as set forth in claim 13, further comprising means for sensing the presence of a cooking receptacle at the first cooktop heating element, wherein a power output to the first cooktop heating element is provided only when the cooking receptacle is present at the first cooktop heating element.

18. A cooktop heating system as set forth in claim 13, wherein the controller includes a processor.

19. A cooktop heating system as set forth in claim 18, wherein the controller is programmed to obtain a heating element power setting from the first user interface device and select a heating element power level that corresponds to the heating element power setting from one of a first heating profile and a second heating profile.

20. A cooktop heating system as set forth in claim 19, wherein a duty cycle of power output to both of the first cooktop heating element and the second cooktop heating element corresponds to the heating element power level.

* * * * *